Patented May 19, 1953

2,639,287

UNITED STATES PATENT OFFICE 2,639,287

THIOSEMICARBAZONES OF FURYLKETONES

John V. Scudi, Riverdale, and Floyd E. Anderson, Yonkers, N. Y., assignors to Nepera Chemical Co., Inc., Yonkers, N. Y., a corporation of New York No Drawing. Application July 13, 1950,
Serial No. 173,681

1 Claim. (Cl. 260—347.2)

This invention relates to new thiosemicarbazones of heterocyclic ketones and particularly to such compounds where the heterocyclic ring is furan.

It is an object of this invention to produce a new class of chemical compounds.

It is another object of this invention to produce a new class of chemical compounds having valuable properties including bacteriostatic properties.

Other objects of the invention will be apparent from the disclosure which follows:

In general, we prepare our compounds by reacting a thiosemicarbazide with a furylketone in a solvent. When the furylketone is soluble in water, water is used as the solvent. When the furylketones are insoluble in water, we use organic solvents, such as methyl, or ethyl alcohol, 1,4-dioxane, etc. or mixtures of these organic solvents and water. We reflux the reaction mixture for a period of 1 to 12 hours, collect and purify the product obtained as described in the specific examples.

In the production of typical thiosemicarbazones of furylketones, the chemical reaction taking place in our process is believed to be as follows:

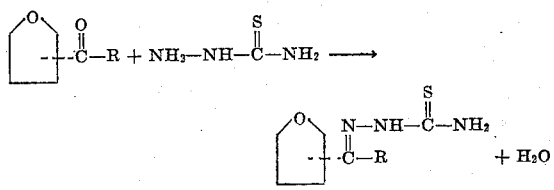

in which R represents a lower alkyl group containing from one to six carbon atoms. The alkyl groups appearing in the alkylfuryl-ketones may be saturated or unsaturated, and may be further substituted. The ketone group of the furan ring may be in the 2-, or in the 3-position. One more of the remaining H- atoms of the furan ring may also be substituted with amino, alkylamino, acylamino, arylamino, alkyl, halogen, cyano, carboxyl, hydroxy, alkoxy, mercapto, alkylmercapto, sulfonic acid, alkylsulfone and other groups.

The following examples disclose the production of illustrative compounds within the scope of our invention, but the invention is not to be considered as limited to the specific process or raw materials disclosed therein or the specific compounds produced thereby.

Example 1

Five and fifty-one-hundredths grams of 2-acetylfuran (2-furyl, methylketone) and 4.55 grams of thiosemicarbazide were placed in a flask containing 150 ml. of ethanol (95%), and refluxed for a period of one and one-half hours. About two-thirds of the solvent was then distilled off at reduced pressure and the residue was chilled in an ice bath to effect crystallization. The crystals were collected, dried and dissolved in 400 ml. of boiling distilled water, to which some decolorizing charcoal was added. The white crystals were collected and dried. The product, 2-acetylfuranthiosemicarbazone, melts at 142–144° C. In a nitrogen determination (Micro-Dumas) there was found N=22.5%, theory 22.9%.

Example 2

Five grams of 2-butyrylfuran (2-furyl, n-propyl ketone) and 3.0 grams of thiosemicarbazide were placed in a flask containing a solvent mixture of 100 ml. ethanol and 50 ml. of distilled water, and refluxed for a period of eleven hours. The solvent mixture was then distilled off until a syrupy residue remained. The residue was placed in a refrigerator and after several days a crystalline product was obtained. It was recrystallized from solution in 12 ml. of ethanol. The product, 2-butyrylfuranthiosemicarbazone melts at 127–129° C. In a nitrogen determination (Micro-Dumas) there was found N=19.9%, theory 19.89%.

Example 3

Ten grams of 2,5-dimethyl, 3-acetylfuran (2,5-dimethyl furyl, 3-methyl ketone) and 6.59 grams of thiosemicarbazide were placed in a flask containing a solvent mixture of 50 ml. of ethanol and 50 ml. of distilled water, and refluxed for a period of eleven and one-half hours. When it had cooled to room temperature, the product formed precipitated out. It was recrystallized from solution in 150 ml. of 50% ethanol. The product, 2,5-dimethyl, 3-acetylfuranthiosemicarbazone, melts at 162–163° C. In a nitrogen determination (Micro-Dumas) there was found N=19.5%, theory 19.8%.

The thiosemicarbazones of furylketones occur as white crystalline substances. They are slightly soluble in water and more readily soluble in alcohols, such as methyl and ethyl alcohols. They are very soluble in glycerine and glycols, such as ethylene and propylene glycols. They are insoluble in benzene, chloroform, ether, and ligroin, but somewhat soluble in dioxane, and slightly soluble in vegetable oils.

Their solubility in dilute acids and alkalies indicates that these compounds are amphoteric, that is, they form soluble salts both with acids and with alkali metals.

The compounds disclosed herein show bacteriostatic properties.

By following the procedures of the examples, thiosemicarbazones of other alkylfurylketones may be produced, such as valerylfuranthiosemicarbazone, caproylfuranthiosemicarbazone, heptoylfuranthiosemicarbazone and the like.

It will be understood that the raw materials, specific procedure, and products disclosed in the examples merely encompass illustrative embodiments of our invention and the scope of the invention is to be limited only by the terms of the claim appended hereto.

We claim:

As a new product, 2,5-dimethyl, 3-acetylfuranthiosemicarbazone.

JOHN V. SCUDI.
FLOYD E. ANDERSON.

References Cited in the file of this patent

UNITED STATES PATENTS

| Number | Name | Date |
|---|---|---|
| 2,261,735 | Gertler | Nov. 4, 1941 |
| 2,354,192 | Verne | July 25, 1944 |
| 2,416,234 | Stillman | Feb. 18, 1947 |
| 2,416,239 | Stillman | Feb. 18, 1947 |

OTHER REFERENCES

Hoggarth, British J. Pharmcol. (1949) 4, pp. 248–253.

Dreizen, Chemical Abstracts (1949), p. 5497 and p. 6735.

Dreizen, J. Dental Research, 28, pp. 288–297 (1949).